United States Patent [19]
Baca et al.

[11] Patent Number: 5,898,593
[45] Date of Patent: Apr. 27, 1999

[54] AUTOMATED DATA STORAGE LIBRARY WITH A MOVABLE COLUMN FOR SELECTIVE IMPORT/EXPORT OF PORTABLE MAGAZINES

[75] Inventors: Francisco Antonio Baca; Kamal Emile Dimitri; Jerry Walter Hammar, all of Tucson, Ariz.

[73] Assignee: International Business Machines Corporation, Armonk, N.Y.

[21] Appl. No.: 09/053,750

[22] Filed: Apr. 2, 1998

[51] Int. Cl.⁶ .............................. G06F 7/00; G11B 15/68; G11B 17/22; B65G 1/00
[52] U.S. Cl. .............................. 364/478.02; 364/478.03; 364/478.06; 364/478.01; 360/92; 369/34; 369/36; 414/274
[58] Field of Search .................... 364/478.02, 478.03, 364/478.06, 478.01, 478.04, 478.05; 360/92; 369/34, 36, 38; 414/274, 273, 277, 279

[56] References Cited

U.S. PATENT DOCUMENTS

| | | | |
|---|---|---|---|
| 4,271,440 | 6/1981 | Jenkins et al. | 360/92 |
| 4,940,275 | 7/1990 | Miki et al. | 296/37.8 |
| 5,216,618 | 6/1993 | Arita et al. | 414/274 |
| 5,220,548 | 6/1993 | Nakatsukasa et al. | 369/36 |
| 5,255,251 | 10/1993 | Fitzgerald et al. | 369/36 |
| 5,303,034 | 4/1994 | Carmichael et al. | 414/274 |
| 5,323,327 | 6/1994 | Carmichael et al. | 364/478.06 |
| 5,337,297 | 8/1994 | Kvifte et al. | 369/36 |
| 5,343,403 | 8/1994 | Beidle et al. | 364/478.02 |
| 5,388,260 | 2/1995 | Monahan et al. | 364/478.02 |
| 5,426,581 | 6/1995 | Kishi et al. | 364/478.02 |
| 5,508,859 | 4/1996 | Hu et al. | 369/36 |
| 5,631,785 | 5/1997 | Dang et al. | 360/92 |
| 5,731,926 | 3/1998 | Gallo et al. | 360/92 |
| 5,740,061 | 4/1998 | Dewey et al. | 364/478.02 |
| 5,761,161 | 6/1998 | Gallo et al. | 360/92 |
| 5,764,615 | 6/1998 | Ware et al. | 360/92 |
| 5,781,369 | 7/1998 | Inazawa et al. | 360/92 |
| 5,818,723 | 10/1998 | Dimitri | 364/478.02 |

FOREIGN PATENT DOCUMENTS

| | | | |
|---|---|---|---|
| 56080847 | 7/1981 | Japan | G11B 15/68 |
| 6240657 | 2/1987 | Japan | G11B 15/68 |
| 62134852 | 6/1987 | Japan | G11B 15/68 |
| 0087643 | 4/1988 | Japan | 369/36 |
| 0112859 | 5/1988 | Japan | 369/36 |
| 0211364 | 8/1989 | Japan | 369/36 |
| 04155649 | 5/1992 | Japan | G11B 15/68 |
| 0512821 | 1/1993 | Japan | G11B 23/023 |

*Primary Examiner*—William E. Terrell
*Assistant Examiner*—Wonki Park
*Attorney, Agent, or Firm*—John H. Holcombe; Robert M. Sullivan

[57] ABSTRACT

Disclosed is an automated data storage library for storage and retrieval and selective export and import of portable data storage media stored in storage cells of portable magazines. Each portable magazine has a detent, and has registration surfaces, such as a sleeve at each of two corners. A columnar elevator supports a columnar stack of the portable magazines, and has an opening at its top level external to the library, and pushes the stack toward the top level. Fixed registration shafts in the library mate with the magazine sleeves to prevent lateral movement while allowing columnar movement of the magazines. The media may be accessed by a picker at the storage cells of the magazines at all levels in the stack internal to the library. A releasable latch engages the detent of the magazine at the penultimate level of the stack (e.g., the top position within the library), holding the stack against the upward pushing of the elevator, and external latches each engage a magazine in the stack at the top level. Selected ones of the latches are released by a library manager or operator to allow the elevator to push a selected magazine in the column to the top level, where it may be exported. The magazines held at the penultimate level or lower may still be accessed by the picker.

13 Claims, 4 Drawing Sheets

| CARTRIDGE/VOLUME SERIAL NUMBERS | MAGAZINE AND CELL LOCATIONS |
|---|---|
| . . . . . | . . . . . |
| . . . . . | . . . . . |
| . . . . . | . . . . . |

94

| MAGAZINE IDENTIFIERS | LIBRARY LOCATIONS |
|---|---|
| . . . . . | X – Y |
| . . . . . | . . . |
| . . . . . | . . . |

95

| CARTRIDGE/VOLUME SERIAL NUMBERS | LIBRARY LOCATIONS |
|---|---|
| DRIVE 1 | X – Y |
| . . . . . | . . . |
| PICKER | CURRENT X – Y |

96

AUTOMATED DATA STORAGE LIBRARY WITH A MOVABLE COLUMN FOR SELECTIVE IMPORT/EXPORT OF PORTABLE MAGAZINES

TECHNICAL FIELD

This invention relates to automated data storage libraries which store portable data storage media for storage and retrieval of portable data storage media, and, more particularly, to input/output stations for the import and export of portable magazines which may hold pluralities of the portable data storage media.

BACKGROUND OF THE INVENTION

In an automated data storage library, numerous storage slots, or cells, arrayed within the library are used to hold data storage media, such as magnetic tape cartridges or cassettes, or optical disk cartridges. The storage slots are typically arranged in planar or cylindrical arrays of rows and columns. A picker, furnished with one or more grippers, is a robotic device which moves along a guideway in a horizontal motion, or about a pivot in a rotary motion, and moves vertically to access the various storage slots with the gripper, and transports selected data storage media amongst the storage slots and one or more read/write stations. The operation of the picker is typically under the direct control of a library manager, which is a program in a data processing library controller typically situated in the library. The library controller is interconnected with one or more host computer systems, such as a mainframe or network computer, which issues commands to the library. The read/write station may be interconnected with the host(s) and, after a data storage medium is delivered to the station, typically searches for, and reads selected data from or writes data to the selected data storage media under the control of a host.

Libraries also typically contain input/output stations or ports through which an operator may pass one or more data storage media to be added to the storage array and through which the picker may pass data storage media to be removed from the data storage array. For example, in coassigned U.S. Pat. 5,731,926, Gallo et al., issued Mar. 24, 1998, "Convenience Input/Output Station" an input/output station uses an elevator to vertically translate a tape cartridge or a non-removable magazine containing several tape cartridges into or out of the library. The elevator is movable between two positions, a maximum vertical position above the top surface of the library and a minimum vertical position within the library. An operator adds cartridges to the library by placing them into the input/output station situated at its maximum vertical position. The elevator then lowers the cartridges into the library by moving to its minimum vertical position. The picker then removes the cartridges from the input/output station.

However, an input/output station for single groups of cartridges may be highly inefficient and unable to allow the import, export or exchange of selected groups of cartridges or other data storage media of the library in a reasonable amount of time. For example, should a failure of the picker occur, it would be advantageous to be able to rapidly export any selected group of the data storage media from the failing library and import them into a fully functioning library.

SUMMARY OF THE INVENTION

An object of the present invention is to provide an automated data storage library having the capability for selectively and rapidly exporting groups of portable data storage media out of the library.

Disclosed is an automated data storage library for storage, retrieval, selective export and import of portable data storage media, at least some of the media stored in storage cells of portable magazines. Each portable magazine has a detent, and each portable magazine has at least one registration surface, such as a sleeve at each of two diagonal corners. At least one columnar elevator supports from none to a plurality of the portable magazines in a columnar stack, the columnar elevator having an opening at an endmost level (e.g., the top) external to the library for insertion and removal of the selected portable magazine(s) at the end (top) of the columnar stack, the columnar elevator urging the stack toward the endmost level (top). At least one fixed registration surface is provided, which may be in the form of cylindrical surfaces of shafts at diagonal corners of the elevator, for mating with the portable magazine registration surfaces to prevent lateral movement while allowing columnar movement of the portable magazines. At least one picker accesses the portable data storage media at the storage cells of the portable magazines in the stack at all levels internal to the library, and transports the portable data storage media amongst the storage cells and one or more read/write stations. A releasable latch is positioned at the columnar elevator for engaging the one of the portable magazines at the penultimate level of the columnar stack (e.g., the top position within the library), by its detent, for holding the portable magazine and any portable magazines thereunder against the upward urging of the columnar elevator. The penultimate level latch is positioned to, upon releasing the latch, to release the portable magazine, allowing the columnar elevator to push the portable magazine toward the endmost level (top), and to engage the detent of the immediately downwardly adjacent portable magazine. A plurality of external releasable latches are positioned externally to the library at the columnar elevator for engaging the portable magazines at the end level of the columnar stack and external to the library.

The operator or a library manager may release ones of the penultimate level and external latches to allow a selected number of the portable magazines to be moved to the end level of the column until the selected portable magazine(s) is external to the library at the endmost level. The external latches hold ones of the portable magazines and, upon releasing a latch, the portable magazine is released, allowing withdrawal of a selected portable magazine from the stack.

An entire columnar stack of the library, and all stacks of the library, may comprise stacks of portable magazines supported by the elevators and releasable latches of the present invention, allowing rapid loading and unloading of the library.

Also in accordance with the present invention, a library manager table relating the portable magazines to the levels of the at least one columnar stack is provided for tracking the portable magazines. An identifier is provided on each portable magazine, and the library manager is coupled to a reader for reading the portable magazine identifiers for updating the table to track the portable magazines moved from the library to the endmost level and moved from the endmost level into the library.

For a fuller understanding of the present invention, reference should be made to the following detailed description taken in conjunction with the accompanying drawings.

DETAILED DESCRIPTION OF THE INVENTION

Figure 1:
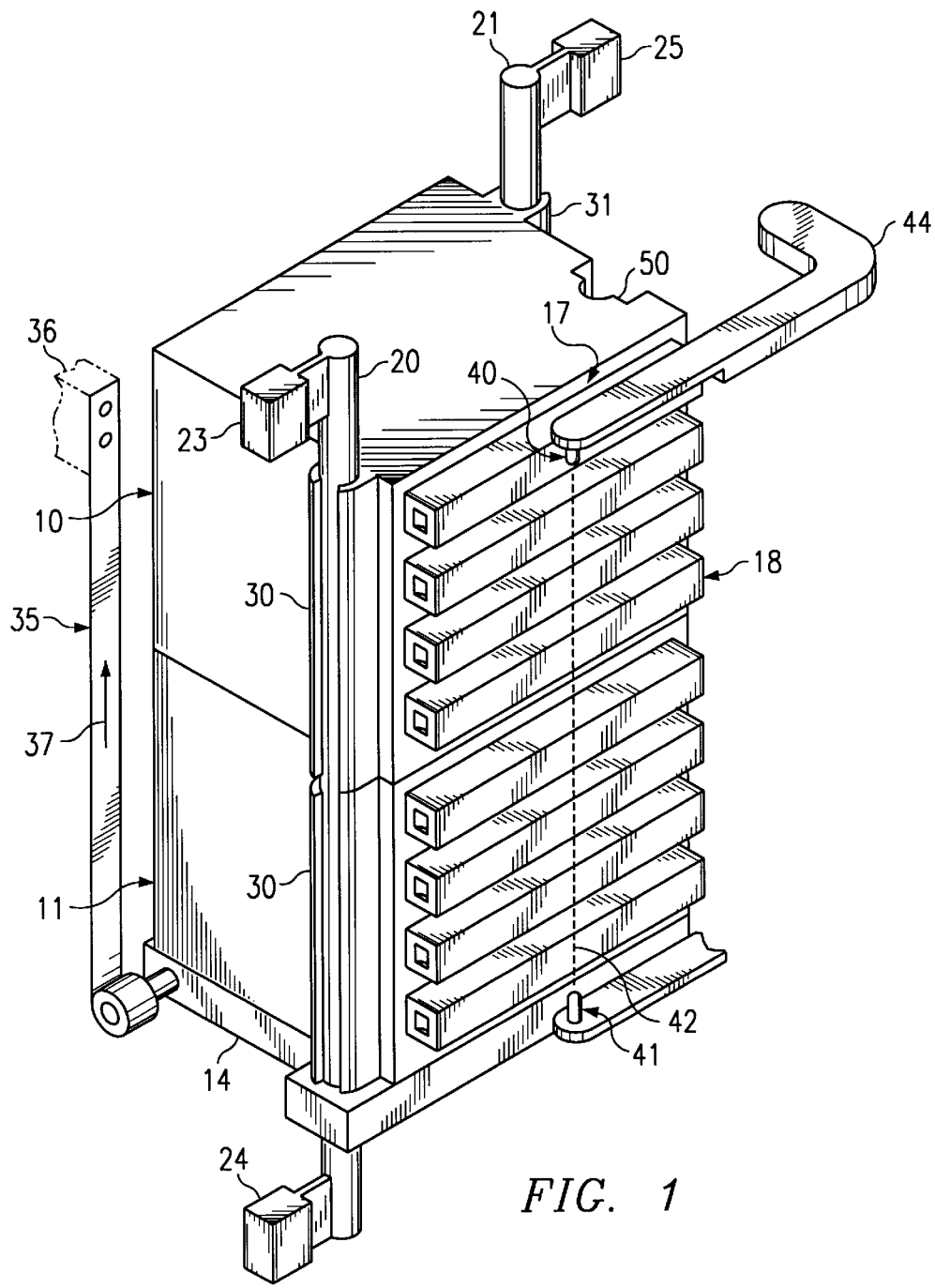
FIG. 1 is a perspective illustration of a stack of portable magazines, an elevator and registration surfaces of the automated data storage library of the present invention.
Figure 2:
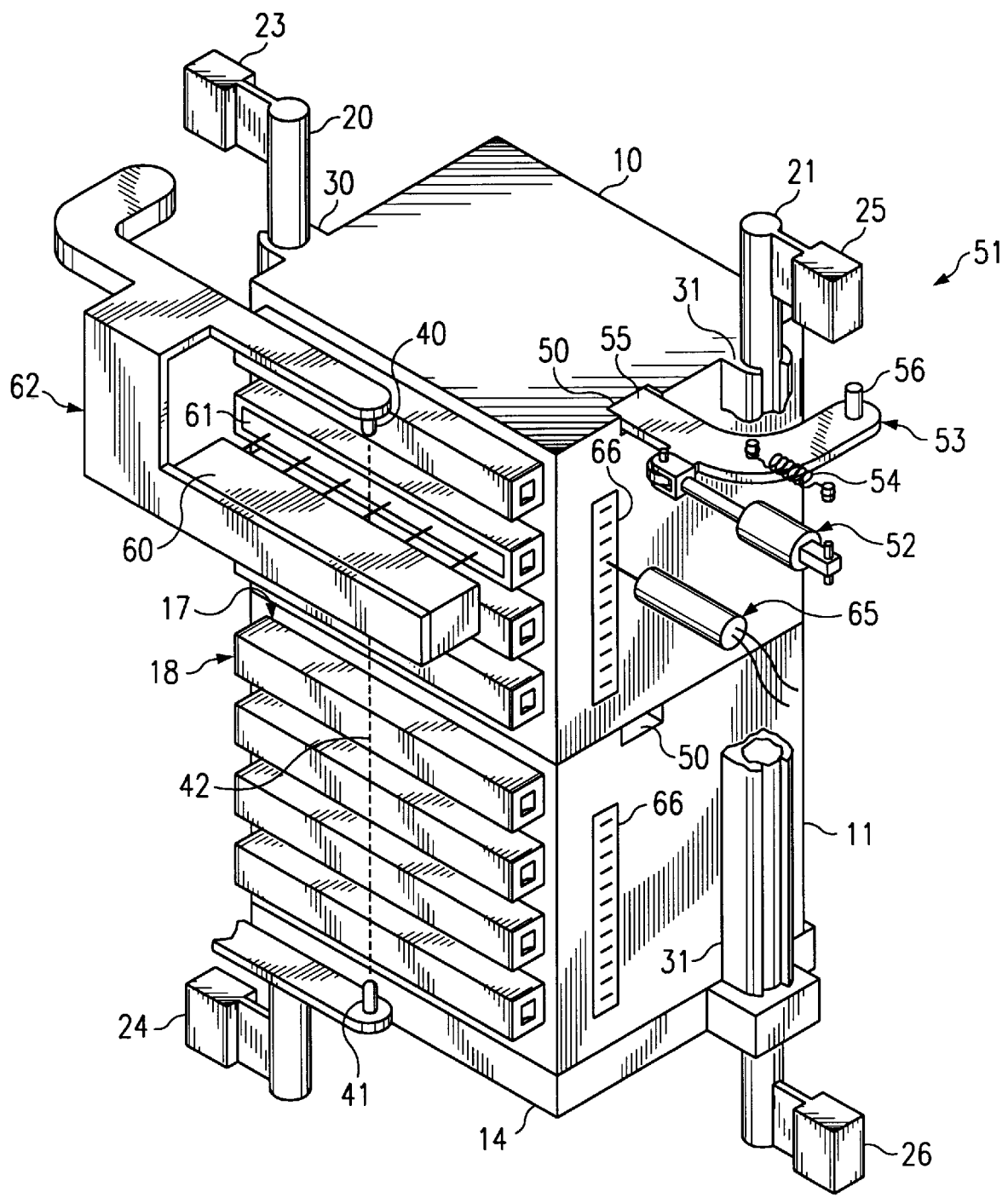
FIG. 2 is a perspective illustration of a release latch, reader and scanner of the present invention employed with the automated data storage library of FIG. 1.

Referring to FIGS. 1 and 2, portable magazines 10 and 11, which may be two of a stack of magazines, are supported on an elevator 14. Each of the portable magazines 10 and 11 includes a plurality of storage cells 17 for holding portable data storage media 18. The storage cells each has an opening for the insertion or removal of a portable data storage medium 18. The term "portable data storage media" used herein refers to any portable housing structure containing any type of data storage media. Examples of portable data storage media 18 are magnetic tape cartridges, magnetic tape cassettes, optical disk cartridges, optical tape cartridges, the cartridge or cassette comprising the portable housing structure. The portable magazines may hold the same types of cartridges or cassettes, or, in a mixed media library, different types of cartridges or cassettes. The portable data storage media 18 may be described as "cartridges" for ease in description, but any suitable portable data storage media is intended.

The elevator 14 slides up and down on two diagonally opposed shafts 20 and 21. The shaft 20 is attached to the library at attachment points 23 and 24 and the shaft 21 is attached to the library at attachment points 25 and 26, both aligned in the columnar direction.

Each portable magazine has registration sleeves 30 and 31 at each of two diagonal corners. The internal surfaces of the sleeves are cylindrical registration surfaces which mate with the external cylindrical registration surfaces of the shafts 20 and 21, which prevent lateral movement while allowing columnar movement of the portable magazines. The sleeves 30 and 31 may extend partially around the shafts 20 and 21, or may extend entirely around the shafts. The shafts thus form fixed registration surfaces for the portable magazines 10 and 11.

A spring 35, such as a constant force spring, is attached to the library at attachment point 36 and urges the elevator 14 in the direction of arrow 37, vertically, or in the columnar direction of shafts 20 and 21. The portable magazines are supported by the elevator 14, which is urged upward by spring 35. Other means for biasing, or urging, the elevator 14 in the columnar direction, such as motors, may be envisioned in accordance with the present invention. A spring is preferred due to its self-powering capability without the need for supplying external power.

Sensors 40 and 41, such as LED sensors, mounted inside the library, provide a beam 42, to monitor the insertion and extraction of cartridges 18 from the portable magazines. The beam 42, when intercepted, indicates that a cartridge is in the process of being accessed or that the cartridge is dislodged. One of the sensors, e.g. sensor 40 mounted on bracket 44, may be the source of the beam 42, and the other the detector.

Each of the portable magazines 10 and 11 is provided with a detent 50. The detent, or notch 50, is engaged by a latch to hold the stack of portable magazines in place against the urging of spring 35. One example is the releasable latch 51 at the top of the internal level of the library, as will be explained. Latch 51 is a solenoid 52, lever 53 and spring 54. Solenoid 52, when activated to release lever 53, pulls against the force of spring 54 away from the portable magazine, and, when deactivated, the spring 53 forces the lever against the magazine so that the tip 55 of lever 53 engages the detent 50. Release activation of solenoid 52 withdraws lever 53 from the portable magazine, so that the tip 55 of lever 53 pulls away from detent 50. The latch 51 may be manually operated by means of handle 56 on lever 53 to pivot the lever and remove or insert tip 55 of the lever to or from detent 50. Other suitable latch mechanisms, ranging from fully automatic to semi-automatic to fully manual, may be envisioned which will allow the latching of a portable magazine to hold it against the urging of spring 35.

A scanner 60, such as a CCD bar code reader, reads cartridge identifiers, for example, in the form of bar code labels 61, on the front of the cartridges 18. The scanner 60 may be mounted on the same bracket 62 as the LED sensor 40 and identifies the individual cartridges 18 in the storage cells 17 of the portable magazine 10 as each magazine is moved across the scanner. The bracket 62 of FIG. 2 is an alternative arrangement from bracket 44 of FIG. 1.

A reader 65, such as a side mounted bar code pen, reads portable magazine identifiers, for example, in the form of bar code labels 66, on the side of the portable magazines 10. The reader 65 identifies the portable magazines as each magazine is moved across the reader.

Thus, the combination of scanner 60 and reader 65 can update an inventory of portable magazines 10 and of their contents of cartridges 18.

Figure 3:
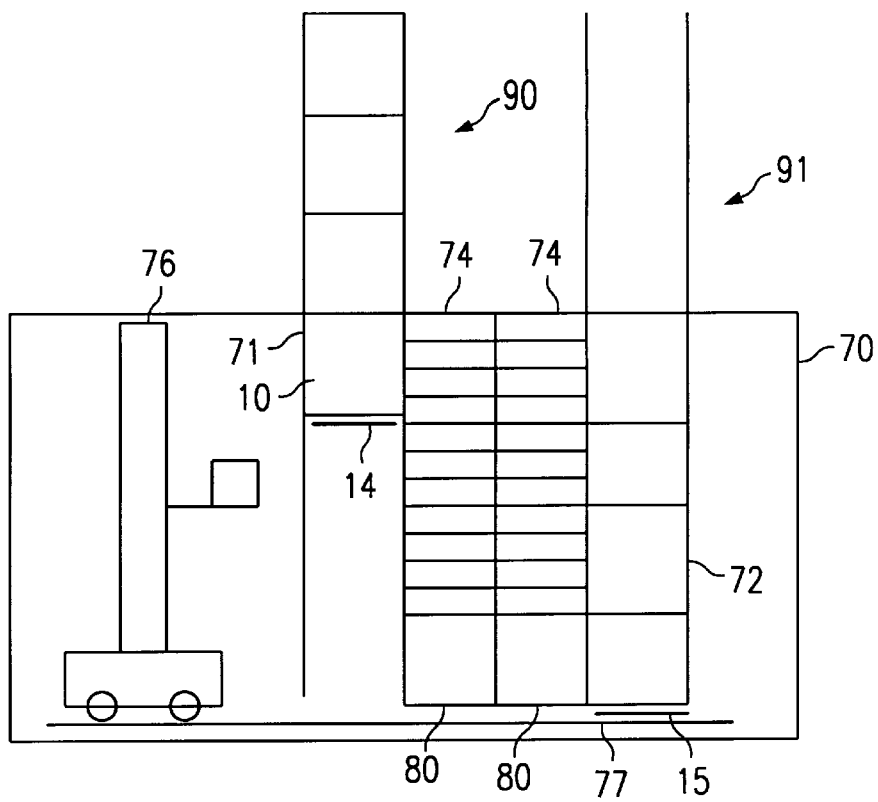
FIG. 3 is a diagrammatic illustration of the automated data storage library of the present invention.
Figure 4:
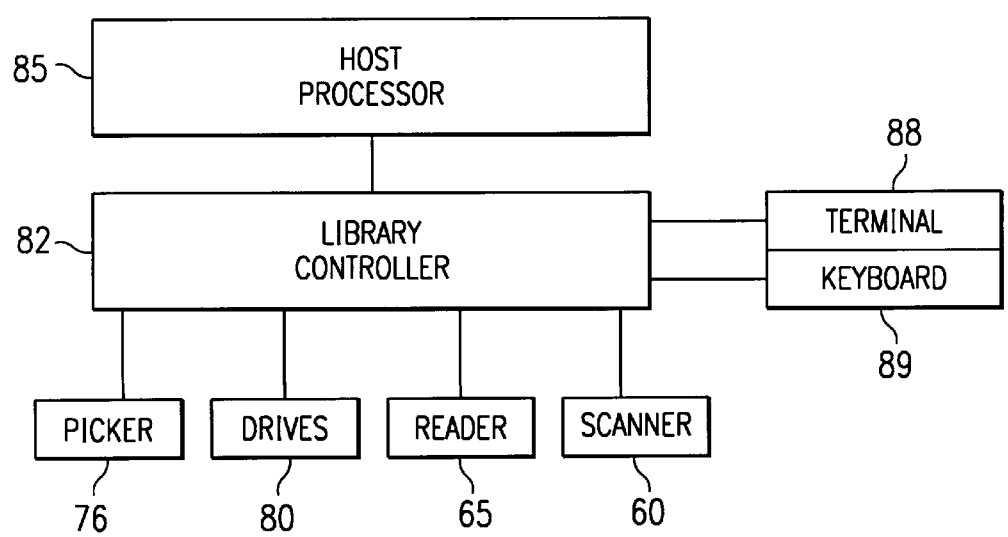
FIG. 4 is a block diagram of the automated data storage library of the present invention.

Referring additionally to FIGS. 3 and 4, the organization of a library in accordance with the present invention will be explained.

A library 70 may comprise one or more stacks 71 and 72 of portable magazines 10. The library may also have columns 74 of storage slots for individual cartridges. The stacks 71 and columns 74 may be arranged in a planar fashion or in a cylindrical fashion.

One or more pickers 76, each furnished with one or more grippers, is a robotic device which moves along a guideway 77 in a horizontal motion, or about a pivot in a rotary motion, and moves vertically to access the various storage slots with the gripper, and transports selected data storage media or cartridges 18 amongst the storage slots and one or more read/write stations 80.

The operation of the picker 76 is typically under the direct control of a library manager, which is typically implemented as a program in a data processing library controller 82 which may be situated in or external to, and connected into, the library. The library controller 82 is interconnected with one or more host computer systems 85, such as a mainframe or network computer, which issues commands to the library. The read/write stations 80 may be interconnected with the host(s) 85 and, after a cartridge 18 is delivered to a station, the station typically searches for, and reads selected data from or writes data to the selected cartridge under the control of a host 85.

The library controller is also typically coupled to a terminal 88 which may include a keyboard 89, allowing a library operator to control many of the library operations, such as directing the operation of the latch and loading or unloading of portable magazines into or out of the library in accordance with the present invention.

Each of the stacks 71 and 72 of portable magazines is supported in a column by an elevator 14 or 15, respectively. Each of the columnar elevators has an opening at an endmost level 90 and 91, respectively, external to the library 70 for selective insertion and removal of the portable magazines 10 into or out of the columnar stack. As described above, the elevator 14 or 15 urges the stack 71 or 72 in a columnar direction toward the endmost level 90 or 91, between a minimum columnar position (as illustrated by elevator 15) and a maximum columnar position (at the level at the top of the stack), at which level no magazines in the stack would be within the library 70.

The fixed registration surfaces, described above, for mating with the portable magazine registration sleeves to prevent lateral movement allowing columnar movement of the portable magazines when supported by the columnar elevator, are preferably entirely within the library 70, so that the latch 51 of FIG. 2 is at the top of each stack 71 or 72 within the library at the level immediately adjacent to the endmost level 90 or 91. Herein, the immediately adjacent level is also referred to as the "penultimate level".

Thus, the latch 51 engages the one of the portable magazines at the penultimate level of the columnar stack, at its detent. The latch thereby holds the portable magazine at the penultimate level, and any portable magazines thereunder in the columnar stack 71 or 72, against the upward urging of the columnar elevator 14 or 15. The latch 51 is positioned to, upon releasing the latch, to release the engaged portable magazine, allowing the columnar elevator to move the portable magazine in a columnar direction toward the endmost level 90 or 91, and to engage the detent of the one of the portable magazines immediately adjacent to the released portable magazine in the columnar stack.

Figures 5, 6:
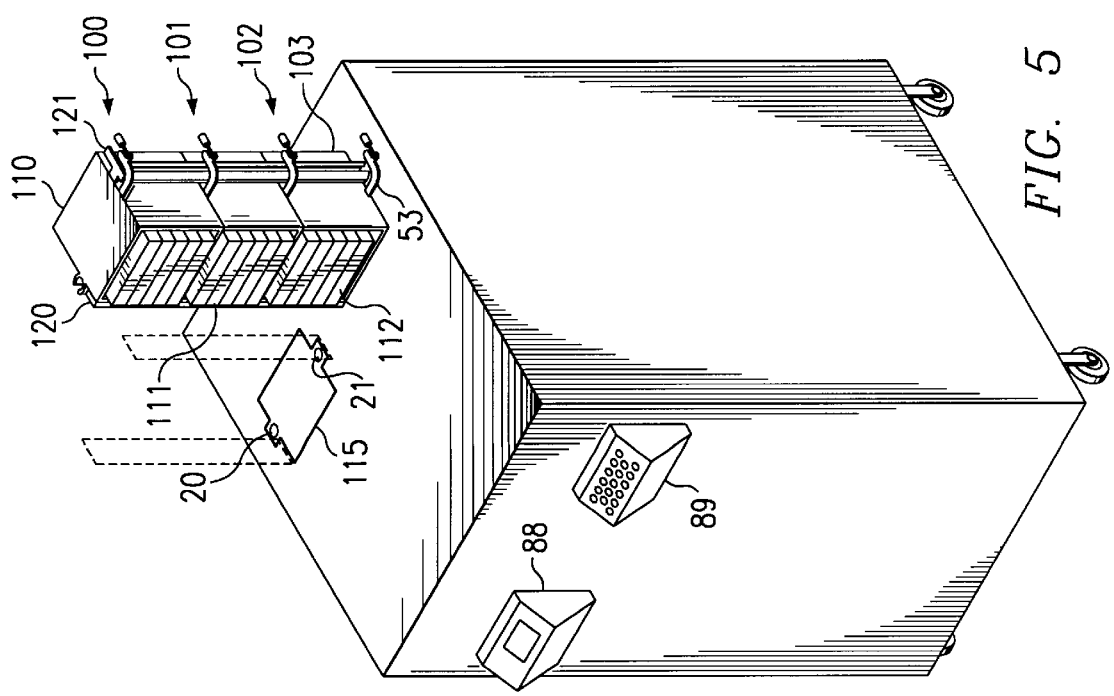
FIG. 5 is a perspective illustration of the top level of the automated data storage library of the present invention.
FIG. 6 is a table depicting the identification of the cartridge and magazine locations in the automated data storage library of FIGS. 3–5.

FIG. 5 illustrates the endmost, or top, level of an embodiment of the automated data storage library of FIGS. 3 and 4, with lever 53 of the penultimate level latch 51 positioned for manual release with the top level of column 115 shown in phantom.

A plurality of separate latches 100, 101 and 102 are mounted on a common bracket 103, each adapted for holding a portable magazine 110, 111 or 112 at its detent. The magazines are above the registration shafts (see registration shafts 20 and 21 in the adjacent column 115) and may therefore be moved laterally out of the stack upon being released by its associated latch. To provide lateral stability to the stack, brace 120 and bracing surface 121 of bracket 103 are provided at either side of the column at the endmost level of the column. The latches 100, 101 and 102 also provide forward and backward stability to the column.

Thus, the library manager may selectively operate the internal latch 51 and ones of the latches 100, 101 and 102 to allow the elevator to lift one or a sequence of magazines into the endmost level of the column, to export the one or selected ones of the sequence of magazines.

Specifically, if the second portable magazine in the stack, e.g., portable magazine 111, is selected for export, only penultimate level latch 53 and the first external latch 102 are released by the library manager (or operator). The elevator then pushes portable magazines 110 and 111 to the endmost level and latch 101 engages portable magazine 110. Latches 53 and 102 then engage portable magazines 112 and 111, respectively.

Thus, the portable magazine 111 selected for export is held at the endmost level of the column external to the library, and portable magazine 112 is held at the penultimate level of the column internal to the library by the penultimate level releasable latch 53 and may be accessed by the picker, as may portable magazines under magazine 112. The operator may then selectively release one latch at a time and remove the magazine for which the latch is released, by removing the magazine to the rear of the bracket 103. Any magazine above the one removed will then drop down to replace the removed magazine, and will be engaged by the latch that was previously released. For example, the operator may release external latch 102 and remove the selected portable magazine 111, thereby exporting the magazine.

One or a sequence of magazines may be imported by the operator by loading the magazines one at a time from the top and to the rear of the bracket 103, either allowing the lever of the latch to slide on the magazine and into the detent, or by pulling the lever until the magazine is in place. The magazines will be held in place until the library manager indicates that the magazines may be imported and the operator pushes the magazines into the library against the urging of the elevator.

In an alternative arrangement, the elevator may be powered against the urging of the spring, and may automatically lower while the latches are released, thereby importing the magazines into the library.

Thus, the portable magazine placed in the stack 71 or 72 at the endmost level 90 or 91 and pushed down into the library 70, against the upward urging of the elevator 14 or 15, is engaged by the respective latch 51 at its detent, thereby holding the magazine in place at the penultimate level of the stack. Once at the penultimate level internal to the library 70, the cartridges in the magazine may be accessed by the picker 76.

Referring to FIGS. 1–5, as each portable magazine 10 is inserted into the library 70 from the opening at the endmost level 90 or 91, or is released by the latch and is moved from the library 70 to the endmost level 90 or 91, reader 65 reads the bar code label 66 of the magazine, and scanner 60 reads the bar code label 61 of the cartridges 18 in the storage cells 17 of the portable magazine. The identifiers of the bar code labels 66 and 61 are supplied by the reader 65 and scanner 60, respectively, to the library controller 82 and to the library manager. Thus, the library manager is able to update an inventory of the cartridges and of the magazines.

The library controller 82 includes a table illustrated in FIG. 6 which correlates each of the cartridges in the library with its magazine and storage slot location in the magazine 94, the X-Y location in the library of each magazine 95, and the X-Y location of each drive and the current position of each picker 96. The X-Y locations of the portable magazines may be by magazine level in the library. A similar table may be employed for the fixed storage slots 74, containing only identifiers of the cartridges correlated with the locations of their fixed storage slots in the library. Portions 94 and 95 of the table, taken together with any fixed storage slot locations, comprise a cartridge inventory table. Alternatively, these portions of the table may be organized into a single table or single portion of a library table. This table is updated each time a magazine is moved into or out of the library at the endmost level of a column, each time a cartridge is accessed, each time a cartridge is stored, and each time a picker is moved. Thus, the library controller 82 is able to employ a cartridge identifier in a command from a host 85 to identify the magazine containing the cartridge, and the storage slot location of the cartridge, determine the location of any cartridge in a drive, and the current position of the pickers.

This information is used in conjunction with job queue contents by the library manager to schedule picker moves and to schedule the export of selected magazines. Thus, the library manager may respond to an input command ordering export of selected cartridges to identify the magazine(s) containing the selected cartridges, and respond to an input command export of export of selected magazines, by operating the latches to move the selected magazines to the endmost level of the column(s) for export.

Many conventional libraries employ a vision system on the picker in order to track the inventory of the library. This requires that each cartridge added to, or removed from, the library at a conventional input/output station must be scanned by the vision system on the picker and then the cartridge delivered to its library storage slot while the library controller is tracking the cartridge. If the library is entirely composed of movable columnar stacks 71 and 72, and has no fixed storage slots 74, the scanner 60 and reader 65 of the library of the present invention may replace the vision system of the conventional library. Thus, the scanner 60 and reader 65 provide the information to conduct the logging for the cartridge inventory table.

The library manager interlocks the picker movement with the unloading and loading of portable magazines from or into a stack on a particular column. An interference command will be sent to the picker control, requesting that the picker not be operated in the column while unloading or loading is active.

The importation of a magazine may be initiated either by the operator at the keyboard 89 or by the host 85.

When a magazine is required to be imported, the operator will place the magazine to be imported at the endmost position 90 or 91 of the desired column 71 or 72, thereby placing the magazine at the top of the stack. Then, after the picker is in an idle mode as indicated at terminal 88 or at an indicator light, the operator will pull the lever 53 of the latch 51 at the desired column, and will push the magazine downward into the library. The tip 55 of lever 53 of the latch will then drag on the side of the magazine as the magazine is pushed into the library. When in the library, the latch engages the detent 50 of the magazine, holding it and all the magazines in the stack thereunder in position.

When a magazine is required to be exported, the host will instruct the operator that a selected magazine is ready to be exported and indicate the column 90 or 91 which has the selected magazine. After the picker is indicated as being in the idle mode, the operator or the library controller will activate the latch 51 to release the stack of magazines, and release other latches 100–102 as needed until the selected magazine reaches the endmost level, and the operator will pick the magazine manually.

The lever 53 of the latch 51, after being activated and released, is forced by the spring 54 towards the released magazine so that the tip 55 of the lever 53 drags on the side of the magazine as the magazine moves upward. Upon the magazine reaching the endmost level, the tip 55 of the lever drops into the detent 50 of the next magazine, holding the next magazine and all the magazines in the stack thereunder in position. The latch 51, and latches 100–102 may again be released to move the next magazine to the endmost level.

Also, during import or export, as the magazines move into or out of the library, the scanner 60 and reader 65 detect the cartridge identifiers and the magazine identifiers of the imported or the exported magazines and provide the identifiers to the library controller 82.

The library manager may automatically adjust the stack length, and the library locations of every magazine in the column for the table of FIG. 6, every time a magazine is exported or imported, shortening or lengthening the range of the picker. The library manager may also note the empty slot locations 17 in the magazines, while also tracking which cartridge is in which slot in which magazine.

A sequence of magazines may be imported or exported at one time by stacking the magazines on the endmost level of the columns and pushing them into the library, or by removing the entire stack.

Thus, the cartridges contained in the magazines may be rapidly loaded and unloaded into and out of the library.

While the preferred embodiments of the present invention have been illustrated in detail, it should be apparent that modifications and adaptations to those embodiments may occur to one skilled in the art without departing from the scope of the present invention as set forth in the following claims.

We claim:

1. An automated data storage library for storage, retrieval and selective export of portable data storage media, at least some of which media may be stored in portable magazines, said portable magazines each having a plurality of storage cells for storing ones of said data storage media, each storage cell having an opening for insertion and removal of a portable data storage medium, each said portable magazine having a detent, each said portable magazine having at least one registration surface, said library comprising:

at least one columnar elevator for supporting from none to a plurality of said portable magazines in a columnar stack, said columnar elevator having an opening at an endmost level external to said library for insertion and removal of said portable magazines at said endmost level of said columnar stack, said columnar elevator urging said stack in a columnar direction toward said endmost level between a minimum columnar position and a maximum columnar position;

at least one fixed registration surface for mating with said at least one portable magazine registration surface to prevent lateral movement of said portable magazines and allowing columnar movement of said portable magazines when supported by said columnar elevator;

at least one read/write station for receiving said portable data storage media;

at least one picker for accessing said portable data storage media at said storage cells of said portable magazines in said stack supported by said at least one columnar elevator at all levels internal to said library, and for accessing said portable data storage media at said at least one read/write station, and for transporting said portable data storage media amongst said storage cells and said read/write station;

a penultimate level releasable latch positioned at said columnar elevator for engaging the one of said portable magazines at the penultimate level of said columnar stack, by said detent thereof, for holding said portable magazine and any portable magazines thereunder in said columnar stack against said upward urging of said columnar elevator, said penultimate level latch positioned to, upon releasing said penultimate level latch, to release said portable magazine, allowing said columnar elevator to move a selected number of said portable magazines in a columnar direction toward said endmost level through said elevator opening, and to engage the detent of the one of said portable magazines immediately adjacent to a selected one of said released portable magazines in said columnar stack; and a plurality of external releasable latches positioned externally to said library at said columnar elevator for engaging said portable magazines at said endmost level of said columnar stack and external to said library, each by said detent thereof, for holding said released portable magazines, said latches positioned to, upon releasing a selected said external latch, release said selected portable magazine, allowing withdrawal of said selected portable magazine from said stack, said stack of remaining portable magazines internal to said library held in position by said penultimate level releasable latch.

2. The automated data storage library of claim 1 additionally arranged for import of said portable magazines, wherein each of said external releasable latches, when no portable magazine is engaged thereby, is positioned to allow insertion of a portable magazine into said columnar stack, said external releasable latch engaging said inserted portable magazine at said detent thereof supporting said portable magazine in position for said at least one registration surface thereof to engage said at least one fixed registration surface of said library.

3. The automated data storage library of claim 2, wherein said library columnar direction is substantially a vertical direction, and said lateral direction is substantially a horizontal direction.

4. The automated data storage library of claim 1, wherein said portable magazines additionally have "a machine-readable identifier" thereon, and wherein said library additionally comprises a reader for reading said "machine-readable portable" magazine identifiers.

5. The automated data storage library of claim 4, wherein said library additionally comprises a library manager for tracking said portable magazines, said library manager comprising a table relating said portable magazines to said levels of said at least one columnar stack internal to said library, said library manager coupled to said reader and said reader provides said read portable magazine identifiers to said library manager for updating said table to track said portable magazines moved from said library to said endmost level and moved from said endmost level into said library.

6. The automated data storage library of claim 4, wherein said treader is stationary and reads said "machine-readable portable magazine identifier" as each said portable magazine moves in the columnar direction between said endmost level and said penultimate level as urged by said columnar elevator or as pushed against said urging of said columnar elevator, said columnar movement moving said machine-readable portable magazine identifier past said reader.

7. The automated data storage library of claim 1, wherein said portable data storage media additionally have machine-readable identifiers positioned thereon so as to be readable while said portable data storage media are stored in said storage cells of said portable magazines, and wherein said library additionally comprises: a library manager for tracking said portable data storage media; and a scanner positioned for reading said data storage media identifiers of said portable data storage media stored in storage cells of said portable magazines as said portable magazine moves in the columnar direction between said endmost level and said penultimate level as urged by said columnar elevator or as pushed against said urging of said columnar elevator, said columnar movement moving said portable magazine data storage media in said storage cells past said reader, said scanner coupled to said library manager and providing said read identifiers to said library manager.

8. The automated data storage library of claim 7, wherein said library manager comprises a table relating said portable data storage media to said portable magazines containing said media of said at least one columnar stack, said library manager coupled to said reader and said reader provides said read portable magazine identifiers to said library manager for updating said table to track the portable data storage media contained in said portable magazines as said portable magazines are moved from said library to said endmost level and moved from said endmost level into said library.

9. The automated data storage library of claim 1, wherein said at least one registration surface of said portable magazines comprises two registration surfaces, respectively at opposite corners of said portable magazines in said lateral direction, and wherein said at least one fixed registration surface comprises two columnar registration surfaces, respectively at opposite corners of said columnar elevator in said lateral direction.

10. The automated data storage library of claim 9, wherein said registration surfaces of said portable magazines comprise partial substantially cylindrical surfaces, and wherein said columnar fixed registration surfaces comprise mating substantially cylindrical shafts.

11. The automated data storage library of claim 1, wherein said penultimate level releasable latch and said external releasable latches are manually operable.

12. The automated data storage library of claim 1, wherein said library additionally comprises a library manager for tracking said portable magazines, and wherein said penultimate level releasable latch and said external releasable latches comprise automatic latches operable by said library manager.

13. The automated data storage library of claim 1, wherein said at least one columnar elevator comprises a plurality of elevators arranged in parallel, and wherein said at least one fixed registration surface comprises a plurality of sets of fixed registration surfaces arranged in parallel, and in parallel to said plurality of columnar elevators and additionally comprising one said penultimate level releasable latch and a plurality of said external releasable latches positioned at each of said columnar elevators.

* * * * *